United States Patent
Byers et al.

(10) Patent No.: US 7,991,889 B2
(45) Date of Patent: Aug. 2, 2011

(54) APPARATUS AND METHOD FOR MANAGING NETWORKS HAVING RESOURCES HAVING REDUCED, NONZERO FUNCTIONALITY

(75) Inventors: Charles C. Byers, Wheaton, IL (US); Steven L. Makowski, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1180 days.

(21) Appl. No.: 10/841,012

(22) Filed: May 7, 2004

(65) Prior Publication Data

US 2005/0262242 A1    Nov. 24, 2005

(51) Int. Cl.
*G06F 15/173* (2006.01)
(52) U.S. Cl. ......... 709/226; 709/224; 709/225; 709/229
(58) Field of Classification Search .......... 709/226, 709/224, 229, 225; 33/226
See application file for complete search history.

(56) References Cited

U.S. PATENT DOCUMENTS

| | | | | |
|---|---|---|---|---|
| 5,386,551 | A | * | 1/1995 | Chikira et al. .................. 714/46 |
| 6,556,659 | B1 | * | 4/2003 | Bowman-Amuah ......... 379/9.04 |
| 6,614,781 | B1 | * | 9/2003 | Elliott et al. .................. 370/352 |
| 6,658,467 | B1 | * | 12/2003 | Rice et al. ..................... 709/224 |
| 6,662,211 | B1 | * | 12/2003 | Weller .......................... 709/204 |
| 6,801,940 | B1 | * | 10/2004 | Moran et al. .................. 709/224 |
| 7,035,392 | B2 | * | 4/2006 | Rakotoarivelo et al. ...... 379/242 |
| 7,099,942 | B1 | * | 8/2006 | Wilson et al. ................. 709/224 |
| 2002/0059427 | A1 | * | 5/2002 | Tamaki et al. ................. 709/226 |
| 2004/0082338 | A1 | * | 4/2004 | Norrgard et al. ........... 455/452.2 |
| 2005/0071470 | A1 | * | 3/2005 | O'Brien et al. ............... 709/226 |
| 2005/0180429 | A1 | * | 8/2005 | Ghahremani et al. ... 370/395.21 |
| 2006/0161895 | A1 | * | 7/2006 | Speeter et al. ................ 717/121 |
| 2008/0120113 | A1 | * | 5/2008 | Loyall et al. .................. 704/270 |

OTHER PUBLICATIONS

SEARCHNETWORKING.COM, "Network Operations Center," http://searchnetworking.techtarget.com/sDefinition/0,,sid7_gci214122,00.html, Mar. 31, 2004, 1 pg., TechTarget, Needham, MA, USA.
SEARCHNETWORKING.com, "Central Office", http://searchnetworking.techtarget.com/sDefinition/0,,sid7_gci211765,00.html: Mar. 31, 2004; 1 pg., TechTarget, Needham, MA, USA.
TECHWEB.com; "SONET", www.techweb.com/encyclopedia/defineterm?term=SONET; Mar. 5, 2004; pp. 1-3, CMP Media LLC, Seattle, WA, USA.
ABOUT.COM, Introduction to SONET, "Applications", http://compnetworking.about.com/library/weekly/aa092800a.htm, Mar. 5, 2004; pp. 1-4, About, Inc., New York, NY, USA.
ABOUT.COM, Introduction to SONET, "Rings", http://compnetworking.about.com/library/weekly/aa092800b.htm, Mar. 5, 2004; pp. 1-5, About, Inc., New York, NY, USA.
Wu, Tsong-Ho; A Passive Protected Self-Healing Mesh Network Architecture and Applications, IEEE/ACM Transactions on Networking, Feb. 1994, pp. 40-52, vol. 2, No. 1, IEEE, USA.
ORACLE, Maximum Availability Architecture: Overview, Oct. 2002, pp. 1-13, Oracle Corporation, Redwood Shores, CA, USA.

\* cited by examiner

*Primary Examiner* — Jeffrey Pwu
*Assistant Examiner* — Abdelnabi O Musa
(74) *Attorney, Agent, or Firm* — Carmen Patti Law Group, LLC

(57) ABSTRACT

A deferred maintenance mode for network elements is described, wherein upon failure of one or more resources in a network element, redundant resources are used to preserve functionality. Upon subsequent failure of the redundant resources, function can revert to the first set of resources if those resources have a higher level of functionality. This deferred mode is valuable in situations where it may not be possible to repair failed elements in a timely manner, or if there is a limit upon the amount of backup power available.

30 Claims, 5 Drawing Sheets

APPARATUS AND METHOD FOR MANAGING NETWORKS HAVING RESOURCES HAVING REDUCED, NONZERO FUNCTIONALITY

TECHNICAL FIELD

The invention relates generally to networks and more particularly to management of network resources.

BACKGROUND

Network elements, for example, switches and routers, are designed with an assumption that a maintenance strategy will be applied to the network element when resources of the network element fail. In one example, a fault-tolerant system employs redundant resources to provide functionality of the network element for a call over the network until the failed resources can be replaced. Currently, when a fault occurs within a Field Replaceable Unit ("FRU") on a network element, the network element deactivates the FRU and marks the FRU as "dead". The network element employs a redundant FRU to provide the functionality of the FRU marked as "dead". A crafts person arrives at the site of the network element and replaces the dead FRU for a new FRU within a few hours. As one shortcoming, if the redundant FRU fails before the crafts person can arrive at the site to replace the dead FRU, the network element terminates all functionality provided by the network element for connections placed over the network. The crafts person may be unable to arrive at the site of a failed network element for several reasons. These include natural causes, like storms, blizzards, earthquakes, hurricanes, etc. They could also include man-made causes such as terrorist acts, war, protests, and labor disputes. It is desirable that the network elements continue to function as well as possible, even in the event of delayed maintenance actions.

In another example, the network element receives periodic manual tuning of parameters of the resources of the network element. For example, a crafts person arrives at the site of the network element to adjust the gain of optical signal components of the network element. As another shortcoming, where the crafts person is unable to arrive at the site of the network element, the optical signal components degenerate into a state of undesired functionality.

Thus, a need exists for extending a duration of time in which a network element provides functionality for connections placed over a network when resources of the network element fail.

SUMMARY

The invention in one implementation encompasses a method. A resource of one or more resources of a network element is employed to provide at least a subset of functionality of the network element when a resource of the one or more resources of the network element operates in a state of reduced, nonzero functionality.

Another implementation of the invention encompasses an apparatus. The apparatus comprises a maintenance component that allocates a resource of one or more resources of a network element to provide at least a subset of functionality of the network element when a resource of the one or more resources of the network element operates in a state of reduced, nonzero functionality.

DESCRIPTION OF THE DRAWINGS

Features of exemplary implementations of the invention will become apparent from the description, the claims, and the accompanying drawings in which:

DETAILED DESCRIPTION

Figure 1:
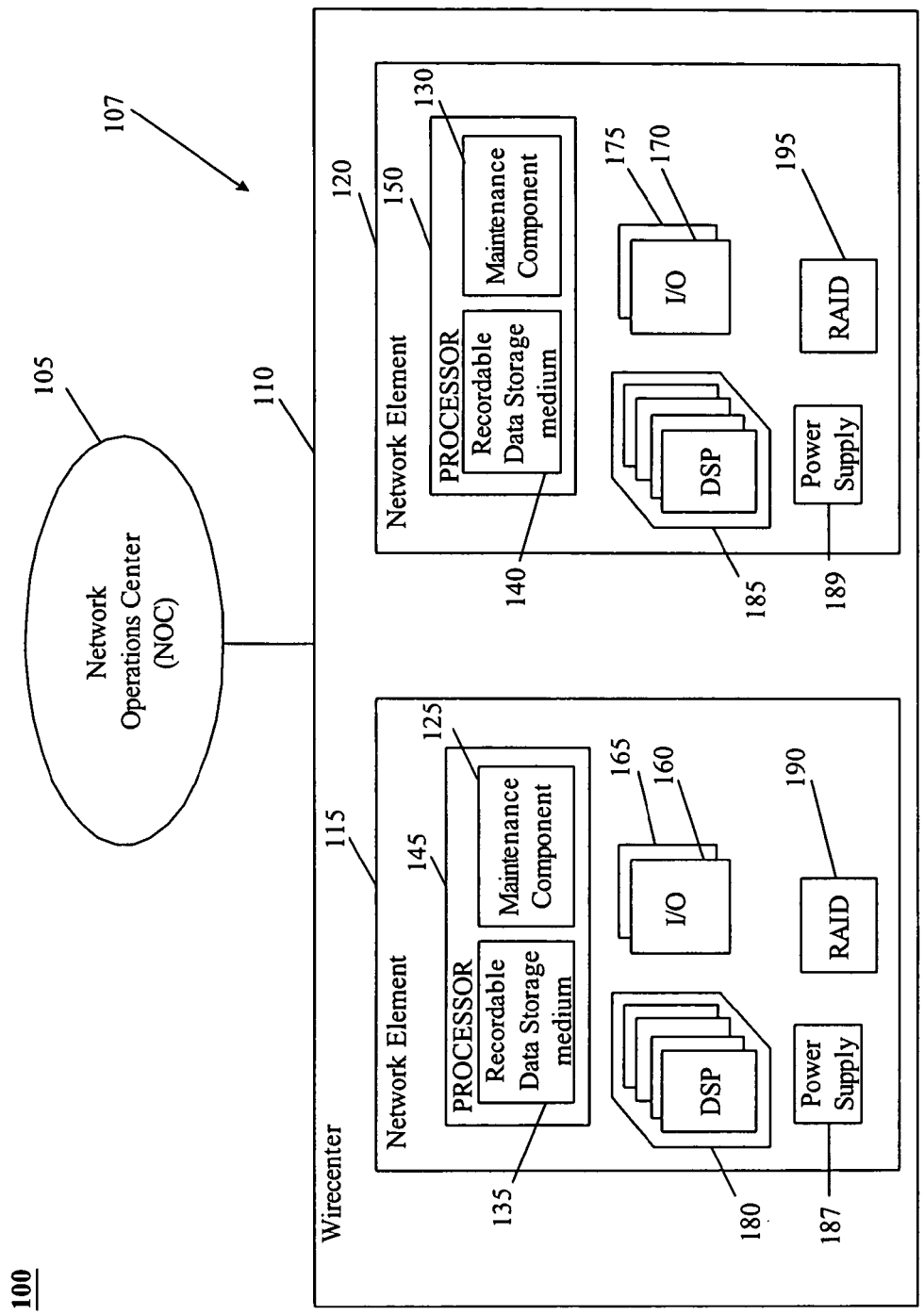
FIG. 1 is a representation of one or more network operation centers, one or more wirecenters, one or more network elements, one or more maintenance components, one or more recordable data storage mediums, and one or more resources.
Figure 2:
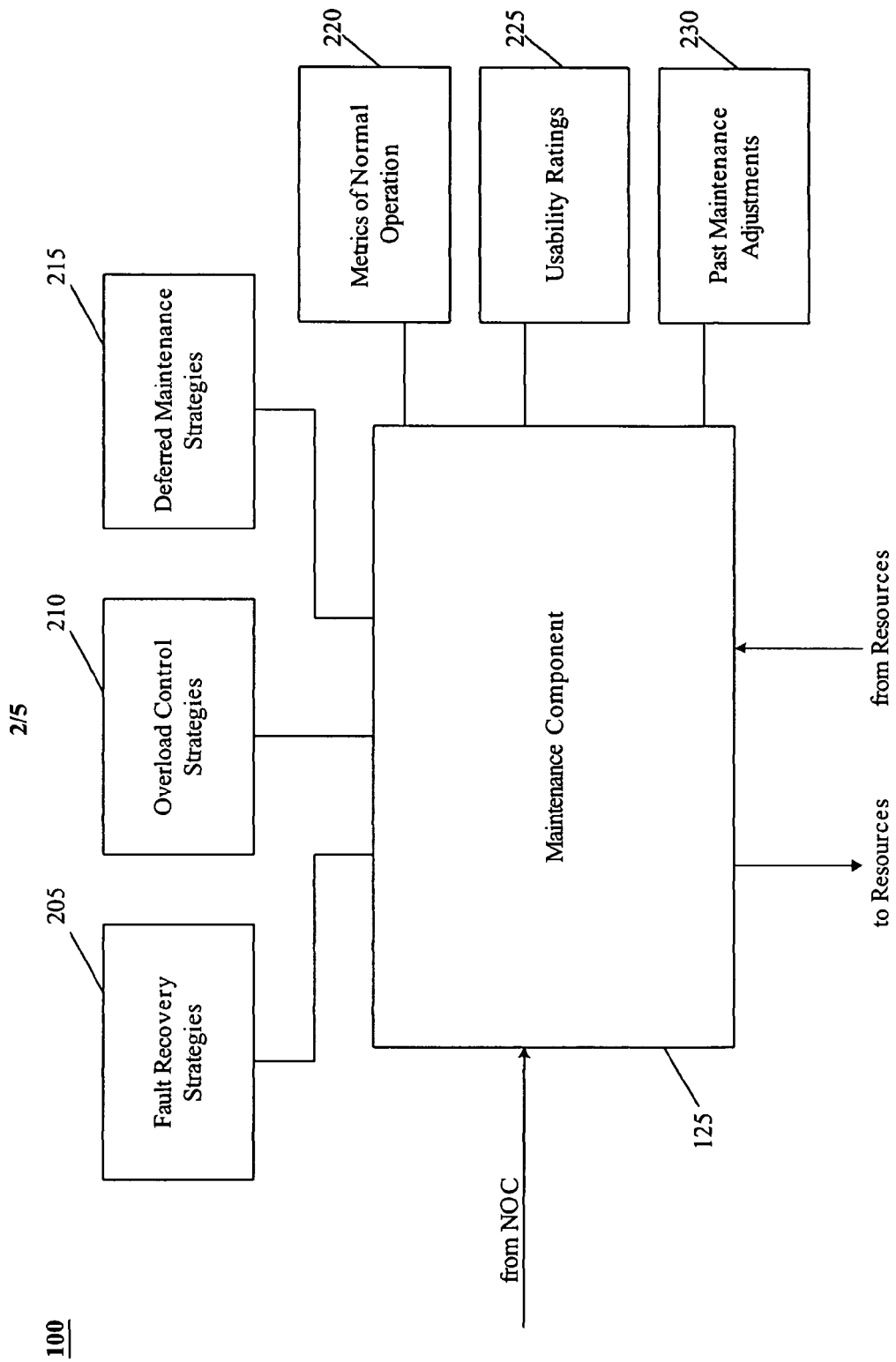
FIG. 2 is a representation of the one or more maintenance components of the apparatus of FIG. 1.

Turning to FIGS. 1 and 2, the apparatus 100 in one example comprises one or more network operation centers ("NOCs") 105, one or more wirecenters 110, and one or more network elements 115 and 120 of the network 107. The wirecenter 110 in one example comprises a collection of network elements in a central location that serves the needs of many network users. For example, the wirecenter 110 in one example comprises one or more of: a traditional telecommunications central office, a remote site in a telecommunications network, a cable television headend, a computer room, a wiring closet, an industrial process control room, or a government/military electronic command center. The network elements 115 and 120 in one example comprise one or more maintenance components 125 and 130, one or more recordable data storage mediums 135 and 140, one or more resources 145, 150, 160, 165, 170, 175, 180, 185, 190 and 195, and one or more power supplies 187 and 189. The recordable data storage mediums 135 and 140 store one or more fault recovery strategies 205, one or more overload control strategies 210, one or more deferred maintenance strategies 215, one or more metrics of normal resource operation 220, one or more usability ratings 225, and one or more past maintenance adjustments 230, as will be described herein. The resources 145 and 150 comprise one or more computer processors. The resources 160 and 165, and the resources 170 and 175 respectively comprise one or more redundant elements, for example, one or more active I/O controllers and one or more redundant I/O controllers. The resources 180 and 185 comprise computer boards containing four digital signal processing ("DSP") chips. The resources 190 and 195 comprise redundant array of independent disk ("RAID") controllers used for bulk data storage.

The maintenance components 125 and/or 130 communicate with the network operation center 105 and one or more of the resources 145, 150, 160, 165, 170, 175, 180, 185, 190 and 195. The maintenance component 125 receives one or more notifications to operate in a deferred maintenance mode from the network operation center 105. In another example, the maintenance component 130 makes a determination to operate in the deferred maintenance mode. In one example, the network element 120 receives one or more maintenance commands from the network operation center 105. The maintenance component 130 makes a determination that the network operation center 105 is unavailable and/or damaged if a maintenance "command/heartbeat" is not received from the network operation center 105 within a pre-defined duration of time, as will be appreciated by those skilled in the art. The maintenance components 125 and/or 130 communicate with the resources 145, 150, 160, 165, 170, 175, 180, 185, 190 and 195 to determine if a resource, for example, the resource 160, operates in a state of reduced, nonzero functionality. In another example, when one DSP chip of the four DSP chips on the resource 180 fails, for example, the computer board, the resource 180 operates in a state of reduced, nonzero functionality.

When operating in the deferred maintenance mode, the maintenance components 125 and/or 130 employ the fault recovery strategies 205, the overload control strategies 210, and the deferred maintenance strategies 215 to provide at least a subset of functionality of the network elements 115 and/or 120 until maintenance is performed on the network elements 115 and/or 120. The maintenance component 130 employs the deferred maintenance strategies 215 to select and/or allocate the resources 150, 170, 175, 185 and 195 of the network element 120 to provide a subset of functionality of the network element 120 when a resource, for example, the resource 195, operates in a state of reduced, nonzero functionality.

When a resource of the one or more resources of the network element 120 operates in a state of reduced, nonzero functionality, the management component 130 employs the deferred maintenance strategies 215 to provide as much functionally of the network element 120 as possible for as long as possible (i.e., until maintenance is performed on the network element 120). In one example, the management component 130 divides a set of functionality of the network element 120 into a subset of critical functionality and a subset of non-critical functionality. The management component 130 withholds power to one or more resources, for example, the resource 185, that provide the subset of non-critical functionality and provides power to one or more resources, for example the resources 170 and 175, that provide the subset of critical functionality. In another example, one DSP chip from the four DSP chips of the resource 185 fails. The management component 130 continues to employ the resource 185, but reduces an amount of work distributed to the resource 185 based on the failed DSP chip of the resources 185.

In one example, the maintenance components 125 and/or 130 determine a usability rating for each of the resources of the network elements 115 and/or 120 based on the deferred maintenance strategies 215. The usability rating for a resource is based on a level of functionality available for the resource. The usability rating for the resource indicates an amount of functionality available from the resource, as will be explained herein. The maintenance component 125 determines a usability rating for the resources 145, 160, 165, 180 and 190 from results of performance tests and/or information of the resource from error logs and/or status registers for the resource. In one example, the maintenance component 125 executes one or more performance tests on the resources 145, 160, 165, 180 and 190 of the network element 115 and evaluates one or more results returned from the performance tests. In another example, the maintenance component 125 obtains information of the resources 145, 160, 165, 180 and 190 by monitoring error logs and/or status registers for the resources to determine one or more usability ratings for the resources 145, 160, 165, 180 and 190.

For example, the maintenance component 125 makes one or more comparisons of the results from the performance tests of the resource 180 to one or more metrics of normal results 220 for the performance tests of the resource 180. The maintenance component 125 quantifies the comparisons to determine a level of functionality available from the resource 180. In one example, the usability rating is a percentage of the level of functionality available for the resource 180 compared to a normal level of functionality for the resource 180. In another example, the usability rating is based on the types of functionality available for the resource 180. The maintenance component 125 employs the usability ratings to select a resource, for example, the resource 165, of one or more resources, for example, the resources 160 and 165, of the network element to provide at least the subset of functionality of the network element 115. For example, the maintenance component 125 compares a usability rating for the resource 160, for example, a first I/O controller, to a usability rating for the resource 165, for example, a second I/O controller, to determine which of the resources 160 and 165 has the greatest usability rating. The maintenance component 125 in one example stores the usability ratings for the resources 145, 160, 165, 180 and 190 in the recordable data storage medium 135. Upon request from the network operation center 105, the maintenance component 125 employs the usability ratings of the resources 145, 160, 165, 180 and 190 to generate maintenance reports for the network element 115.

In another one example, the maintenance components 125 and/or 130 selectively allocate power to one or more of the resources 145, 150, 160, 165, 170, 175, 180, 185, 190 and 195 of the network elements 115 and/or 120 based on the deferred maintenance strategies 215 to provide at least a subset of functionality of the network elements 115 and/or 120. For example, the maintenance component 130 employs the deferred maintenance strategies 215 to reduce power for non-critical resources of the network element 120, for example, the resource 195. The maintenance component 130 employs the reduction in power for non-critical resources to provide a level of power to critical resources of the network element 120, for example, the resources 150, 185 and 170. In one example, the maintenance component 130 withholds power to the non-critical resources of the network element 120 (e.g. the resource 195) to extend a duration of time to provide power to the critical resources of the network element 120 (e.g., the resources 145, 180 and 190), as will be appreciated by those skilled in the art. In another example, the maintenance component 130 employs the power allocation strategy to selectively provide power to resources 150, 185 and 195 of the network element 120 to provide at least a subset of functional of the network element 120. For example, the maintenance component 130 provides power to the resource 185 at a first period of time. The maintenance component 130 withholds power to the resource 185 at a second period of time. The maintenance component provides power to the resource 195 at a third period of time.

In yet another example, the maintenance components 125 and/or 130 employ the deferred maintenance strategies 215 to perform one or more maintenance adjustments on one or more parameters of one or more resources 145, 150, 160, 165, 170, 175, 180, 185, 190 and 195 to provide at least a subset of functionality of the network elements 115 and/or 120. The maintenance components 125 evaluates one or more past maintenance adjustments for a parameters of the resource 160 to make a prediction for a maintenance adjustment to take on the parameters of the resource 160. The maintenance component 125 performs the maintenance adjustment based on the predication for the maintenance adjustment for the parameter of the resource 160. For example, the maintenance component 125 makes an evaluation of past maintenance adjustments for a gain parameter of a radio equipment resource or optical interface. Based on the evaluation, the maintenance component 125 develops a predication of a maintenance adjustment for the gain parameter. The maintenance component 125 adjusts the gain according the predication of the maintenance adjustment.

An illustrative description of exemplary operation of the apparatus 100 is presented, for explanatory purposes.

Figure 3:
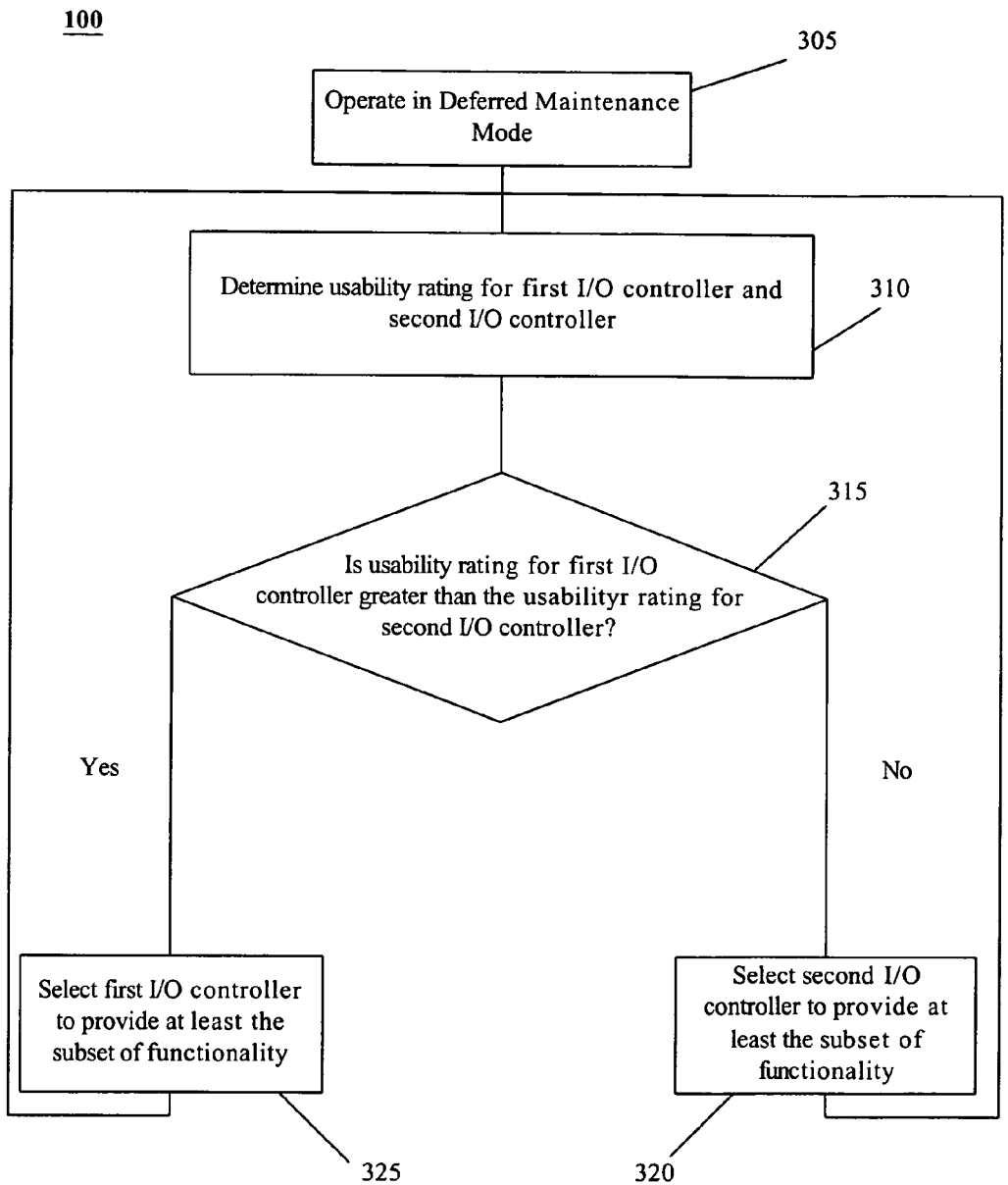
FIG. 3 is a representation of an exemplary process flow of selecting a resource of the one or more resources based on usability ratings for the resources of the apparatus of FIG. 1.

Turning to FIG. 3, in STEP 305, the maintenance component 125 receives a notification from the network operation center 105 of the network 107, for example, a military network, to operate in the deferred maintenance mode. In STEP 310, the maintenance component 125 determines a usability rating for the resource 160, for example, an active I/O controller, of the network element and a usability rating for the resource 165, for example, a redundant I/O controller, of the network element. The usability rating for the resource 160 (e.g., the first I/O controller) is 50%. The resource 160 is unable to process packets that are received too close together in time. The usability rating for the resource 165 (e.g., the second I/O controller) is 100%. In STEP 315, the maintenance component 125 compares the usability rating for the resource 160 to the usability rating for the resource 165. In STEP 320, the maintenance component 125 selects the resource 165 to provide a subset of functionality of the network element 115. The resource 165 processes packets received over the network 107 regardless of priority-level. For example, the resource 165 processes packets with priority levels of a Private, a Sergeant, and a General.

The maintenance component 125 repeats STEPS 310 through 315 and re-determines the usability rating for the resources 160 and 165. Because of failures subsequent to the last pass through of STEPS 310 through 315, the usability rating for the resource 160 is now 50%. The usability rating for the resource 165 is 48%. In STEP 325, the maintenance component 125 selects the resource 160 to provide a subset of functionality of the network component 115 based on the level of functionality available to the resource 160. The resource 160 processes high priority packets, for example, packets originating from a General on the military network. The resource 160 drops packets originating from a Sergeant and/or a Private.

As the resources 160 and 165 continue to degrade due to delayed maintenance actions from a crafts person, the maintenance component 125 repeats STEPS 310 through 315 to re-determine the usability ratings for the resources 160 and 165. The maintenance component 125 continues to select the resource with the highest usability rating from the usability ratings of the resources 160 and 165. As a result, the maintenance component 125 employs the usability ratings of the resources 160 and 165 to provide the most network functionality available by performing a selection of a resource with the most remaining functionality from the resources 160 and 165. The selection of the resource made by the maintenance component 125 may oscillate as the resources 160 and 165 continue to degrade. Advantageously, allowing the selection of the resource made by the maintenance component 125 to oscillate, permits the network element 115 to preserve a maximum possible level of functionality, even as redundant I/O elements, for example, the resources 160 and 165, experience multiple failures.

Figure 4:
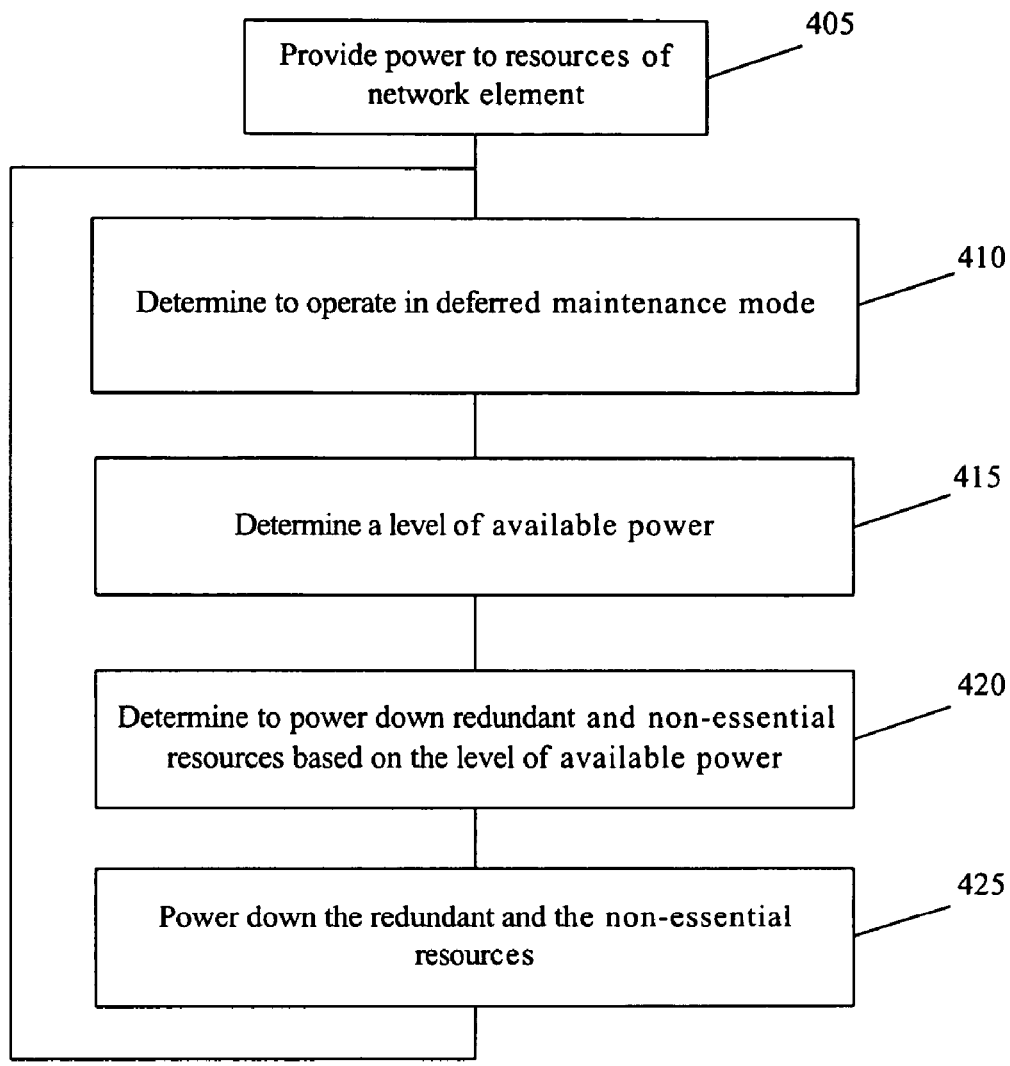
FIG. 4 is a representation of an exemplary process flow of providing power to the resources of the apparatus of FIG. 1.

Turning to FIG. 4, in STEP 405, the power supply component 189 provides power to the resources 150, 170, 175, 185 and 190 of the network element 120. In STEP 410, the maintenance component 130 makes a determination to operate in the deferred maintenance mode. In STEP 415, the maintenance component 130 cooperates with the power supply component 189 to determine a level of available power of the power supply component 189. In STEP 420, the maintenance component 130 determines to power down redundant and non-essential resources based on the level of available power of the power supply component 189. Level of power available includes factors like current capacity, cooling, battery life, and fuel level in auxiliary generators. In STEP 425, the maintenance component 130 cooperates with the power supply component 189 to power down the resource 175 and the resource 195. The maintenance component 130 repeats STEPS 410 through 425 to re-evaluate the level of available power of the power supply component 189. The maintenance component 130 cooperates with the power supply component 189 to power down one or more of the resources 150, 170, 175, 185 and 190 of the network element 120 based on the level of available power of the power supply component 189 while operating in the deferred maintenance mode.

Figure 5:
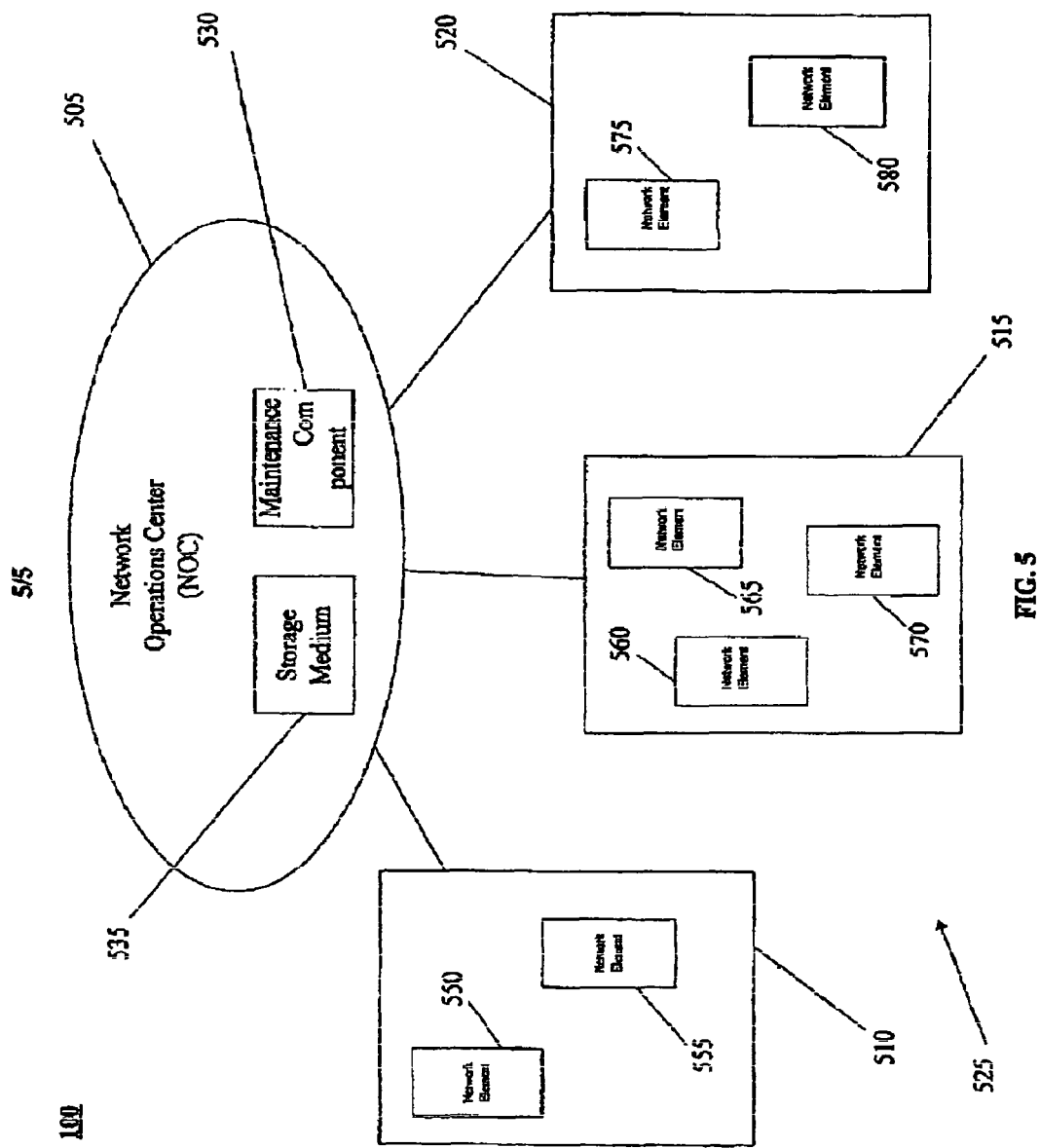
FIG. 5 is another representation of the apparatus of FIG. 1.

Turning to FIG. 5 in another exemplary implementation of the apparatus 100, a network operations center 505 monitors one or more wirecenters 510, 515 and 520 of a network 525, for example, one or more central offices. The wirecenter 510 (e.g., central office) comprises network elements 550 and 555. The wirecenter 515 comprises network elements 560, 565, and 570. The wirecenter 520 comprises network elements 575 and 580. The network operations center 505 comprises a maintenance component 530 and a recordable data storage medium 535. The maintenance component 530 is analogous to the maintenance components 125 and/or 130 of FIG. 1. The recordable data storage medium 535 is analogous to the recordable data storage mediums 135 and/or 140 of FIG. 1. The maintenance component 530 employs the wirecenters 510, 515 and 520 to provide at least a subset of functionality for the network 525 when a wirecenter, for example, the wirecenter 510, of the wirecenters 510, 515 and 520 of the network 525 operates in a state of reduced, nonzero functionality. For example, the maintenance component 530 cooperates with the wirecenters 510 and 515 to route traffic across the network 525 when the wirecenter 520 is unavailable, (i.e., the network elements 560, 565 and/or 570 are unavailable to route the traffic across the network 525).

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. Examples of a computer-readable signal-bearing medium for the apparatus 100 comprise the recordable data storage mediums 135 and 140 of the network elements 115 and 120. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), a wide area network ("WAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
    employing, upon notification from a network operations center (NOC) to operate in a deferred maintenance mode when a redundant resource fails, one or more strategies to select and/or allocate one or more resources of a network element;
    determining if the one or more resources of the network element is operating in a state of reduced, nonzero functionality; and
    employing a resource of the one or more resources of the network element to provide at least a subset of functionality of the network element when the resource of the one or more resources of the network element operates in the state of reduced, nonzero functionality.

2. The method of claim 1, wherein the step of employing a resource of the one or more resources of the network element to provide the at least the subset of functionality of the network element when the resource of the one or more resources of the network element operates in the state of reduced, nonzero functionality further comprises the step of:
    selecting a resource of the one or more resources of the network element to provide the at least the subset of functionality of the network element based on one or more usability ratings for one or more of the one or more resources of the network element.

3. The method of claim 2, wherein the step of selecting a resource of the one or more resources of the network element to provide the at least the subset of functionality of the network element based on the one or more usability ratings for the one or more of the one or more resources of the network element further comprises the steps of:
    performing one or more comparisons of the one or more usability ratings for the one or more of the one or more resources of the network element; and
    selecting a resource of the one or more resources of the network element to provide the at least the subset of functionality of the network element based on one or more of the one or more comparisons of the one or more usability ratings for the one or more of the one or more resources of the network element.

4. The method of claim 2, wherein the step of selecting a resource of the one or more resources of the network element to provide the at least the subset of functionality of the network element based on the one or more usability ratings for the one or more of the one or more resources of the network element further comprises the steps of:
    executing one or more performance tests on the one or more of the one or more resources of the network element;
    making one or more determinations of one or more levels of functionality of the one or more of the one or more resources of the network element based on one or more results of the one or more performance tests; and
    employing the one or more determinations of the one or more levels of functionality of the one or more of the one or more resources of the network element to develop the one or more usability ratings for the one or more of the one or more resources of the network element.

5. The method of claim 4, wherein the step of employing the one or more determinations of the one or more levels of functionality of the one or more of the one or more resources of the network element to develop the one or more usability ratings for the one or more of the one or more resources of the network element further comprises the steps of:
    performing one or more comparisons of the one or more results of the one or more performance tests to one or more metrics of normal results for the one or more performance tests; and
    quantifying the one or more comparisons of the one or more results of the one or more performance tests to determine the one or more levels of functionality for the one or more of the one or more resources of the network element.

6. The method of claim 1, wherein the step of employing a resource of the one or more resources of the network element to provide the at least the subset of functionality of the network element when a resource of the one or more resources of the network element operates in the state of reduced, nonzero functionality further comprises the steps of:
    providing a reduction in a level of power to a resource of the one or more resources of the network element when a resource of the one or more resources of the network element operates in the state of reduced, nonzero functionality.

7. The method of claim 6, wherein the one or more resources of the network element comprise a plurality of resources of the network element, and wherein the plurality of resources of the network element comprise a set of critical resources and a set of non-critical resources, and wherein the step of providing the reduction in the level of power to a resource of the plurality of resources of the network element when a resource of the plurality of resources of the network element operates in the state of reduced, nonzero functionality further comprises the step of:
    providing the reduction in the level of power to the set of non-critical resources of the plurality of resources of the network element; and
    employing the reduction in the level of power to the set of non-critical resources to provide a level of power to the set of critical resources when a resource of the plurality of resources of the network element operates in the state of reduced, nonzero functionality.

8. The method of claim 1, wherein the one or more resources of the network element comprise a plurality of resources of the network element, and wherein the step of employing a resource of the one or more resources of the network element to provide the at least the subset of functionality of the network element when a resource of the one or more resources of the network element operates in the state of reduced, nonzero functionality further comprises the steps of:
    providing power to the plurality of resources of the network element;
    determining a level of available power for the network element;
    making one or more determinations to power down one or more resources of the plurality of resources of the network element based on the level of available power for the network element; and
    powering down one or more of the plurality of resources of the network element.

9. The method of claim 8, wherein the one or more resources of the plurality of resources of the network element comprise a first one or more resources of the plurality of resources of the network element, the method further comprising the steps of:
    re-evaluating the level of available power for the network element; and powering down a second one or more of the plurality of resources of the network element based on the re-evaluated level of available power for the network element.

10. The method of claim 1, wherein the step of employing a resource of the one or more resources of the network element to provide the at least the subset of functionality of the network element when a resource of the one or more resources of the network element operates in the state of reduced, nonzero functionality further comprises the steps of:
performing one or more maintenance adjustments to one or more parameters of a resource of the one or more resources of the network element to provide the at least the subset of functionality of the network element; and
providing the at least the subset of functionality of the network element through employment of the one or more maintenance adjustments.

11. The method of claim 10, wherein the step of performing the one or more maintenance adjustments to the one or more parameters of a resource of the one or more resources of the network element to provide the at least the subset of functionality of the network element further comprises the steps of:
making one or more evaluations of one or more previous maintenance adjustments for the one or more parameters of a resource of the one or more resources of the network element to provide the at least the subset of functionality of the network element;
developing one or more predictions for the one or more maintenance adjustments based on the one or more evaluations of the one or more previous maintenance adjustments; and
performing the one or more maintenance adjustments to the one or more parameters of a resource of the one or more resources of the network element to provide the at least the subset of functionality of the network element based on one or more of the one or more predictions for the one or more maintenance adjustments.

12. The method of claim 1, wherein the one or more resources of the network element comprise a plurality of resources of the network element, and wherein a resource of the plurality of resources of the network element to provide the at least the subset of functionality of the network element comprises a first resource of the plurality of resources of the network element, and wherein the plurality of resources of the network element comprises a second resource of the plurality of resources of the network element, and wherein the step of employing a resource of the one or more resources of the network element to provide the at least the subset of functionality of the network element when a resource of the one or more resources of the network element operates in the state of reduced, nonzero functionality, the method further comprises the steps of:
determining a level of functionality of the first resource of the plurality of resources of the network element at a first time;
determining a level of functionality of the second resource of the plurality of resources of the network element at the first time;
selecting the first resource of the plurality of resources of the network element to provide the at least the subset of functionality of the network element based on the level of functionality of the first resource of the plurality of resources of the network element at the first time and the level of functionality of the second resource of the plurality of resources of the network element at the first time;
determining a level of functionality for the first resource of the plurality of resources of the network element at a second time;
determining a level of functionality of the second resource of the plurality of resources of the network element at the second time; and
selecting the second resource of the plurality of resources of the network element to provide the at least the subset of functionality of the network element based on the level of functionality of the first resource of the plurality of resources of the network element at the second time and the level of functionality of the second resource of the plurality of resources of the network element at the second time.

13. The method of claim 1, wherein the step of employing a resource of the one or more resources of the network element to provide the at least the subset of functionality of the network element when a resource of the one or more resources of the network element operates in the state of reduced, nonzero functionality further comprises the step of:
employing one resource of the one or more resources of the network element to provide the at least the subset of functionality of the network element when the one resource of the one or more resources of the network element operates in the state of reduced, nonzero functionality.

14. The method of claim 13, wherein the step of employing the one resource of the one or more resources of the network element to provide the at least the subset of functionality of the network element when the one resource of the one or more resources of the network element operates in the state of reduced, nonzero functionality further comprises the steps of:
executing one or more performance tests on the one resource;
making a determination of a level of functionality for the one resource; and
employing the level of functionality of the one resource to provide the at least the subset of functionality of the network element.

15. An apparatus, comprising:
a maintenance component that runs on one or more computer processors, said maintenance component being operable to employ, upon notification from a network operations center (NOC) to operate in a deferred maintenance mode when a redundant resource fails, one or more strategies to select and/or allocate one or more resources of a network element, determines if the one or more resources of the network element is operating in a state of reduced, nonzero functionality, and allocates a resource of the one or more resources of a network element to provide at least a subset of functionality of the network element when the resource of the one or more resources of the network element operates in the state of reduced, nonzero functionality.

16. The apparatus of claim 15, wherein the maintenance component determines one or more levels of functionality of the one or more resources of the network element.

17. The apparatus of claim 16, wherein the maintenance component executes one or more performance tests on the one or more resources of the network element; and
wherein the maintenance component employs one or more results of the one or more performance tests to determine the one or more levels of functionality of the one or more resources of the network element.

18. The apparatus of claim 17, wherein the maintenance component selects one resource of the one or more resources of the network component to provide the at least the subset of functionality of the network element based on the one or more levels of functionality of the one or more resources of the network element.

19. The apparatus of claim 17, wherein the maintenance component develops one or more usability ratings of the one or more resources of the network element though a quantification the one or more results of the one or more performance tests; and wherein the maintenance component employs the one or more usability ratings of the one or more resources of the network element to select a first resource of the one or more resources of the network element to provide the at least the subset of the functionality of the network element.

20. The apparatus of claim 15, wherein the one or more resources of the network element comprise a plurality of resources of the network element, and wherein the plurality of resources of the network element comprise a set of critical resources and a set of non-critical resources, further comprising:

a power supply component that provides a first portion of power available to the network element to the set of critical resources, wherein the power supply provides a second portion of the power available to the network element to the set of non-critical resources; and wherein the maintenance component and the power supply component cooperate to provide to the set of non-critical resources, a reduction in the second portion of the power available to the network element; and wherein the maintenance component and the power supply component cooperate to extend a duration of time to provide to the set of critical resources, the first portion of the power available to the network element.

21. The apparatus of claim 15, wherein the one or more resources of the network element comprises a plurality of resources, and wherein a resource of the plurality of resources of the network element to provide the at least the subset of functionality of the network element comprises a first resource of the plurality of resources of the network element; and wherein the maintenance component selects the first resource of the plurality of resources of the network element to provide the at least the subset of functionality of the network element at a first time; and wherein the maintenance component selects a first resource of the plurality of resources of the network element to provide the at least the subset of functionality of the network element at a second time.

22. The method of claim 1, wherein the network element is located in a telecommunications network.

23. The method of claim 1, wherein the network element is located in a government/military electronic command center.

24. The method of claim 1, wherein the network element is located in a cable television headend.

25. The method of claim 1, wherein the at least one redundant element is a redundant I/O controller.

26. The method of claim 1, wherein the one or more resources are digital signal processing (DSP) chips.

27. The method of claim 1, wherein the one or more resources are a redundant array of independent disk (RAID) controllers.

28. The method of claim 1, wherein the determining step occurs after receipt of the notification from the network operations center.

29. The method of claim 1, wherein the one or more strategies further comprise fault recovery, overload control and deferred maintenance strategies.

30. The method of claim 1, wherein the determining step further comprises the step of communicating with the one or more resources of the network element to make the determination.

* * * * *